United States Patent [19]

Dorman

[11] 4,176,555

[45] Dec. 4, 1979

[54] SIGNAL AMPLIFIER SYSTEM FOR CONTROLLED CARRIER SIGNAL MEASURING SENSOR/TRANSDUCER OF THE VARIABLE IMPEDANCE TYPE

[75] Inventor: Richard A. Dorman, Troy, N.Y.

[73] Assignee: Mechanical Technology Incorporated, Latham, N.Y.

[21] Appl. No.: 931,664

[22] Filed: Aug. 7, 1978

[51] Int. Cl.$^2$ ............................................. G01H 11/00
[52] U.S. Cl. ................................. 73/658; 73/1 DV; 324/61 R
[58] Field of Search ............. 73/658, 649, 1 DV, 650; 324/61 R; 330/85

[56] References Cited

U.S. PATENT DOCUMENTS

| | | | |
|---|---|---|---|
| 3,626,287 | 12/1971 | DiNiro | 330/85 |
| 3,860,882 | 1/1975 | Maltby et al. | 330/85 |
| 4,067,225 | 1/1978 | Dorman et al. | 73/1 DV |

Primary Examiner—Stephen A. Kreitman
Attorney, Agent, or Firm—Joseph V. Claeys; Charles W. Helzer

[57] ABSTRACT

A controlled carrier current measuring sensor/transducer signal amplifier system comprising a carrier oscillator for providing a carrier voltage oscillatory signal of known frequency and fixed voltage magnitude. A differential amplifier has the carrier voltage oscillatory signal supplied to one of its inputs. A reference impedance and a variable impedance sensor transducer are connected in a series circuit across the output of the differential amplifier and a first feedback signal is fed back to a second input of the differential amplifier with the first feedback signal comprising the sum of the voltage across the reference impedance and the variable impedance sensor transducer. A buffer amplifier has its input connected to the juncture of the reference impedance and the variable impedance sensor/transducer for deriving an output voltage representative of the instantaneous value of the voltage across the variable impedance sensor/transducer. The output voltage signal from the output of the buffer amplifier is fed back to a third input to the differential amplifier in opposition to the first feedback signal for regulating the current supplied through the reference impedance and the variable impedance sensor/transducer to a substantially constant value whereby the output voltage signal from the output of the buffer amplifier provides a measure of the impedance of the variable impedance sensor/transduer. Preferably, the system further includes shielded conductors interconnected between the reference impedance and the variable impedance sensor/transducer and between the juncture thereof and the input to the buffer amplifier and the output from the buffer amplifier is fed back to the shielding of the shielded conductors whereby the effects of stray capacitance on any measurement obtained from the variable impedance sensor/transducer are minimized.

10 Claims, 3 Drawing Figures

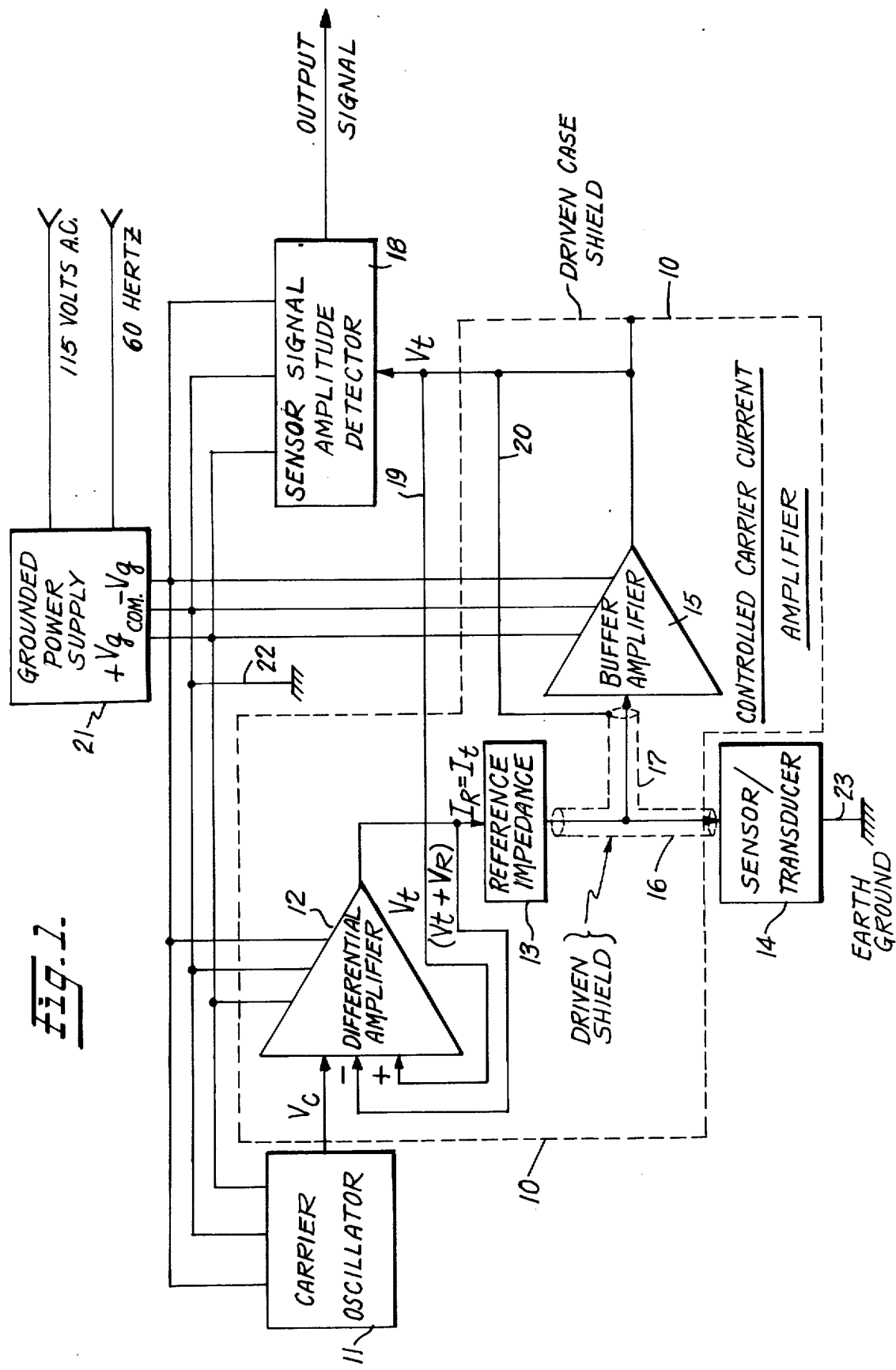

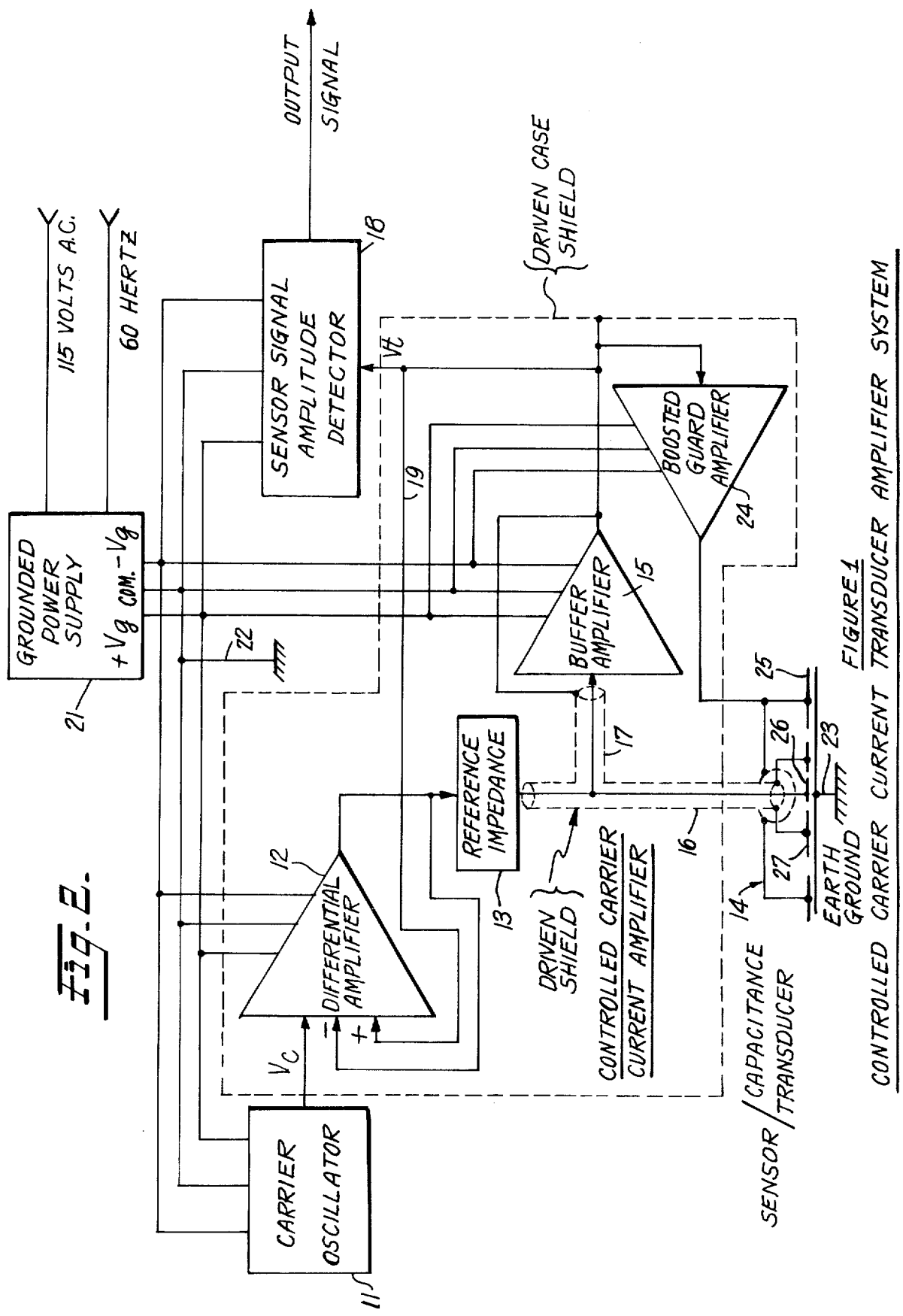

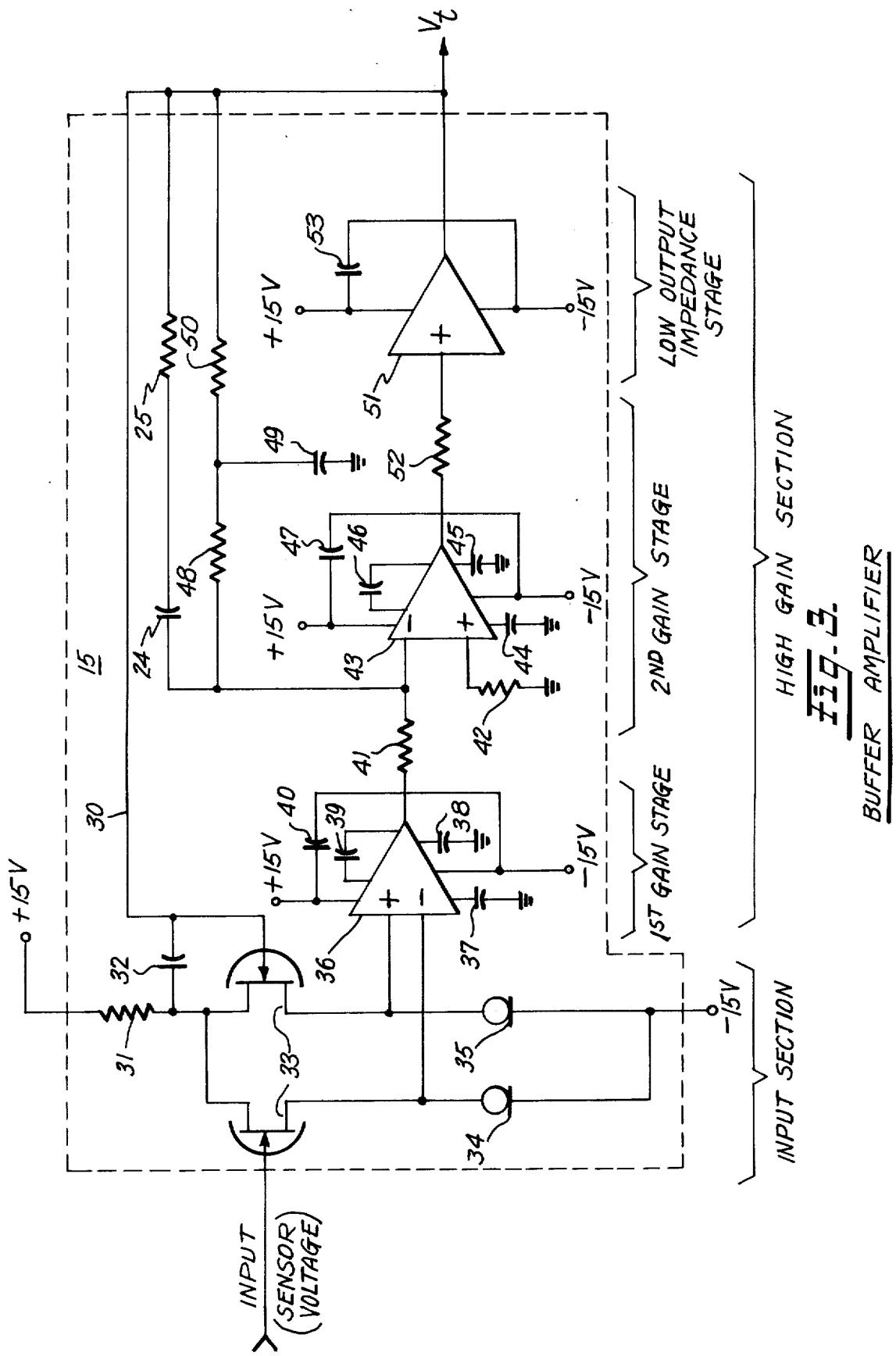

SIGNAL AMPLIFIER SYSTEM FOR CONTROLLED CARRIER SIGNAL MEASURING SENSOR/TRANSDUCER OF THE VARIABLE IMPEDANCE TYPE

BACKGROUND OF INVENTION

1. Field of Invention

This invention relates to a new and improved signal amplifier system for use with controlled carrier signal measuring sensor/transducers of the variable impedance type.

More specifically, the invention relates to a signal amplifier system for improved processing of the electric signal developed across a sensor/transducer of the variable impedance type used in the measurement of certain physical parameters such as displacement, force, torsion, temperature, weight, size, pressure, vibration and the like. The physical parameter to be measured causes a variation in the electrical impedance of the variable impedance sensor/transducer which variation in turn produces a change in the nature of an oscillatory carrier voltage signal appearing across the sensor/transducer during the measurement. Upon being sensed, the change in the carrier voltage oscillatory signal provides a measure of the displacement, size, spacing, or other physical characteristic such as frequency, flow, etc. of the physical parameter being measured. Thus, it will be appreciated that the signal amplifier system serves to sense the variation in impedance caused by the physical parameter being measured by converting the variation into a change in the nature of the oscillatory carrier voltage signal whose value then is detected and displayed and is representive of the physical parameter being measured.

2. Background Problem

One of the more difficult problems to overcome in a variable impedance type measuring system is to obtain a linear output which is isolated from and independent of any stray capacitance coupling effects. While there are a number of known, prior art amplifier systems for processing signals derived from variable impedance type sensor/transducers, most of these known systems require the use of an elaborate array of driven guard shields, isolation transformers, and/or additional floating power supplies all of which complicate construction, maintenance and operation of the equipment as well as add to its expense, size and weight. One such known prior art system, for example, is described in U.S. Pat. No. 3,626,287 issued Dec. 7, 1971 for a "System for Responding to Changes in Capacitance of a Sensing Capacitor". In order to provide an improved signal amplifier system for controlled carrier signal measuring sensor/transducers of the variable impedance type having comparable performance and reliability but without requiring their undue circuit complexity, the present invention was devised.

SUMMARY OF INVENTION

It is therefore a primary object of this invention to provide a new and improved signal amplifier system for use with controlled carrier signal measuring sensor/transducers of the variable impedance type which is capable of producing a linear output signal that is substantially unaffected by stray capacitance coupling.

Another object of the invention is to provide such a signal amplifier system wherein the effects of undersired stray capacitance coupling and the like are minimized without requiring the use of isolation transformers, extraneous floating power supplies or the like.

A still further object of the invention is to provide an improved signal amplifier system having the above set forth characteristics which is relatively simple in construction and inexpensive to manufacture, align and maintain, and yet is reliable in operation.

A feature of the present invention is the use of a positive feedback signal from a buffer amplifier included in the system to control or regulate the value of the carrier signal supplied to the sensor/transducer. The benefit of this feature is that the relationship between the sensor/transducer impedance and the output voltage is maintained linear thereby providing an accurate output measurement. An additional feature of the invention is the use of the positive feedback signal from the buffer amplifier to drive the shielded housing in which the signal processing circuitry is mounted and to drive the shielded conductors used to supply the oscillatory carrier signal to the sensor/transducer and to sense the voltage drop across the sensor/transducer and apply it to the input of the buffer amplifier as a measure of the physical parameter being measured.

In practicing the invention, a controlled carrier current measuring sensor/transducer signal amplifier system is provided which includes a carrier signal oscillator for providing a carrier voltage oscillatory signal of known frequency and fixed voltage magnitude. The carrier voltage oscillatory signal is supplied to one input of a differential amplifier means. Reference impedance means and the variable impedance sensor/transducer means are connected in a series circuit relationship across the output of the differential amplifier to ground. Means are provided for feeding back a first feedback signal to a second input of the differential amplifier with the first feedback signal comprising the sum of the voltages across the reference impedance and the variable impedance sensor/transducer in series. A buffer amplifier has its input connected to the juncture of the reference impedance and the variable impedance sensor/transducer for deriving an output voltage signal representative of the instantaneous value of the voltage across the variable impedance sensor/transducer. Lastly, means are provided for feeding back the output voltage signal from the output of the buffer amplifier to a third input of the differential amplifier in opposition to the first feedback signal for regulating the current supplied through the reference impedance and the variable impedance sensor/transducer to a substantially constant amplitude whereby the output voltage signal appearing at the output of the buffer amplifier provides a measure of the impedance of the variable impedance sensor/transducer and hence a measure of the physical parameter being measured.

Prefered embodiments of the invention further include shielded conductor means interconnected between the reference impedance and the variable impedance sensor/transducer and between the juncture thereof and the input of said buffer amplifier together with means for feeding back the output of the buffer amplifier to the shielding of the shielded conductor for driving the shield at substantially the same voltage and frequency as the inner conductor which supplies the input signal to the input of the buffer amplifier.

The control carrier signal measuring sensor/transducer signal amplifier system further preferably includes sensor/transducer signal amplitude detector means connected to the output from the buffer amplifier for detecting and deriving an output signal representative of the instantaneous impedance value of the variable impedance sensor/transducer as a measure of the physical parameter being measured. It is also preferred that the system further include grounded power supply means for supplying excitation power to at least the carrier signal oscillator, the differential amplifier and the buffer amplifier and that the series connected reference impedance and variable impedance sensor/transducer be connected in series circuit relationship between the output from the differential amplifier and ground.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference character, and wherein:

FIG. 1 is a functional block diagram of the new and improved signal amplifier system for controlled carrier signal measuring sensor/transducers of the variable impedance type;

FIG. 2 is a circuit diagram showing a modification of the system of FIG. 1 for use with a capacitive displacement type variable impedance sensor/transducer; and FIG. 3 is a schematic circuit diagram of a buffer amplifier suitable for use in practicing the invention.

DETAILED DESCRIPTION OF PREFERRED EMBODIMENTS

FIG. 1 is a functional block diagram of a preferred form of the invention and includes a carrier oscillator 11 for producing an output carrier oscillatory signal $V_c$ of known frequency and fixed voltage magnitude. The carrier oscillator 11 may comprise any conventional, known oscillator circuit such as the Frequency Devices, Inc., model 420. The oscillatory carrier signal $V_c$ is supplied as one input to a differential amplifier 12 which is of conventional, commercially available construction and may comprise any of the known operational amplifiers such as the National Semiconductor Corp. L118 having four precision resistors connected thereto for input/output. The output from differential amplifier 12 is supplied across a series circuit comprised by a reference impedance 13 and a sensor/transducer 14 connected in series circuit relationship between the output of the differential amplifier 12 and ground. The reference impedance 13 may comprise a standard resistor, capacitor, inductor, or a network comprised of any combination of the above. A preferred form of sensor/transducer is disclosed in U.S. Pat. No. 4,067,225 issued Jan. 10, 1978 and comprises a shielded capacitance type non-contact displacement and vibration measurement device. For a more detailed description of the device, reference is made to Pat. No. 4,067,225. FIG. 2 of the drawings illustrates just such a capacitance type non-contact displacement and vibration measuring device connected in series circuit relationship with a reference impedance 13 in the form of a standard capacitor across the output of the differential amplifier 12 and will be described in greater detail later. It should be understood, however, that the invention is not restricted to use with capacitance type sensor/transducers but may be employed with any variable impedance type sensor/transducer.

The output signal from the sensor/transducer 14 is supplied to a buffer amplifier 15 whose input is connected via the inner conductor of a shielded conductor 17 to the inner conductor of a shielded conductor 16 interconnecting the reference impedance 13 with the sensor/transducer 14. The point of connection of the two inner conductors is at the juncture of the reference impedance 13 with the sensor/transducer 14 and the outer shields 16 and 17 are electrically interconnected for a purpose to be discussed more fully hereinafter. In practical embodiments of the invention, it is anticipated that the portion of the shielded conductor 16 between the output of the sensor/transducer 14 and the juncture of the shielded conductor 17 may have considerable length as required for a particular measurement application and in some instances may be as much as 100 feet in length. The means by which this is achieved will be appreciated more fully hereinafter.

Buffer amplifier 15 is a specially designed, unity gain, high input impedance amplifier having a large output current drive capability and will be described more fully hereafter with relation to FIG. 3 of the drawings. The output of buffer amplifier 15, indicated at $V_t$, is supplied as the input to a sensor/transducer signal amplitude detector 18 of conventional, commercially available construction. The signal amplitude detector 18 functions to derive a rectified and filtered, varying amplitude D. C. signal whose magnitude is representative of the physical parameter being measured and may be applied to a suitable indicating instrument such as a digital read-out indicator, or may be applied to a computer or other control system utilizing the measurement sensor/transducer as a signal input sensor.

The output signal $V_t$ from the output of buffer amplifier 15 also is supplied across a feedback path conductor 19 to a third input terminal of differential amplifier 12, it is supplied directly to drive the shielded housing 10 in which the processing circuitry is housed, and it is supplied across a feedback path conductor 20 to drive the outer shields of shielded conductors 16 and 17. Power for operating the system is obtained from a grounded power supply 21 having its center terminal grounded at 22 and supplied from a conventional 115 volt, 60 Hertz source of alternating current.

The feedback of output signal $V_t$ across conductor 19 is supplied to a third input of differential amplifier 12 in opposition to the feedback signal $(V_t + V_R)$ fed back to the second input terminal of differential amplifier 12 from its output. By reason of the feedback of output signal $V_t$ from the output of buffer amplifier 15 to the input of differential amplifier 12 in opposition to the $(V_t + V_R)$ feedback signal supplied from across the series connected reference impedance 13 and sensor/transducer 14, the control of the carrier signal current supplied by the circuit across sensor/transducer 14, is accomplished by differential amplifier 12. This amplifier in effect measures the voltage drop across the reference impedance 13 and sets the sensor/transducer current to be proportional to the amplitude of the carrier voltage signal $V_R$ appearing across reference impedance 13. The buffer amplifier 15 is designed so that it has a very high input impedance and provides unity gain so that in effect its output signal $V_t$ represents the voltage across the sensor/transducer side of the reference impedance. By feeding this output signal back through the differential amplifier in opposition to the feedback signal ($V_t + V_R$) fed back to the second input terminal of differential amplifier 12, the differential amplifier then in effect regulates its output current in accordance with the voltage drop $V_R$ across the reference impedance 13. The high input impedance of buffer amplifier 15 allows this function to be performed without presenting a parasitic resistance or capacitance across the sensor/transducer that otherwise would shunt current away from the sensor/transducer impedance.

Reduction of the effect of the sensor/transducer cable capacitance that could otherwise shunt current around the sensor/transducer, is achieved by driving the cable shields 16 and 17 (which are electrically interconnected) with the buffer amplifier 15 output voltage $V_t$ supplied through the feedback conductor 20 to outer shield 17. Driving the cable shields in this manner effectively removes the cable capacitance from the circuit because the carrier voltage on both sides of the distributed cable capacitance is the same. Similar cancellation of the effects of intrahousing capacitance coupling to the components of the processing circuitry and the cable shields is achieved by driving the housing 10 with the output of buffer amplifier 15. The high open circuit gain of the buffer amplifier 15 insures that the output voltage $V_t$ and the cable and housing shield carrier voltage is identical in amplitude and phase angle to the sensor/transducer carrier voltage. The low output impedance of the buffer amplifier 15 insures that there is sufficient drive capability to drive the load comprised by signal amplitude detector 18, differential amplifier 12, shielded conductors 16 and 17 and shielded case 10. The driving of the sensor/transducer cable shields in this manner permits the sensor/transducer 14 to be placed at large distances from shielded housing 10 for the electronic processing circuitry containing differential amplifier 12, buffer amplifier 15, amplitude detector 18, etc., for distances up to 100 feet, while still allowing the system to operate satisfactorily for measurement purposes.

Equation (1) below describes the operation of the system shown in FIG. 1 wherein it is seen that:

$$V_t = - \frac{V_C A_B A_D Z_T}{Z_R} \tag{1}$$

where:

$V_t$ and $V_C$ are the voltage amplitudes at the points shown in FIG. 1:
$A_D$ = Differential Amplifier Gain
$A_B$ = Buffer Amplifier Gain
$Z_R$ = Reference Impedance Value
$Z_T$ = Transducer Impedance Value Equation (1) can be simplified by rearranging the terms in the following manner:

$$V_t = -\left(\frac{V_C A_B A_D}{Z_R}\right)(Z_T) = $$
$$-(I_R)(Z_T); I_R = \left(\frac{V_C A_B A_B}{Z_R}\right) = I_T \tag{2}$$

Equation (2) shows that the term $$\left(\frac{V_C A_B A_D}{Z_R}\right)$$

can be taken to be an equivalent current value equal to $I_R$ which is equal to $I_T$. With each component of $$\left(\frac{V_C A_B A_D}{Z_R}\right)$$

held at a substantially constant value, the carrier current to the sensor/transducer is regulated to a substantially constant magnitude, and the variation in the value of the voltage $V_t$ will depend only on the transducer impedance $Z_T$. The linear relationship between $V_t$ and $Z_T$ is valid over a wide range of $Z_T$ values as long as there is no shunt impedance due to stray capacitance or other coupling paths across $Z_T$.

FIG. 2 illustrates a modified form of the amplifier system according to the invention and is designed specifically for use with the capacitance type sensor/transducer disclosed and claimed in U.S. Pat. No. 4,067,225, the disclosure of which hereby is incorporated in its entirety into this application. In the circuit arrangement of FIG. 2, like components to those employed in the circuit of FIG. 1 have been identified by the same reference character and function in precisely the same manner. The distinguishing feature of the circuit arrangement of FIG. 2 lies in the specific capacitance type sensor/transducer 14 employed with the circuit and in the inclusion of an additional boosted guard amplifier 24. Boosted guard amplifier 24 may be a National Semiconductor, Inc., type LF356 amplifier and has its input connected to the output $V_t$ of buffer amplifier 15. The output of boosted guard amplifier 24 is connected directly to an outer guard ring 25 of the capacitance sensor/transducer 14. As described more fully in U.S. Pat. No. 4,067,225, the capacitance type sensor/transducer 14 is comprised by a central probe member 26, an inner guard ring 27 and an outer guard 25 which are arranged concentrically and adapted to be disposed opposite a grounded surface indicated at 23 while conducting measurements. The central probe member 26 has supplied to it the carrier signal appearing at the output of differential amplifier 12, the inner guard ring 27 has supplied to it the signal $V_t$ appearing at the output of buffer amplifier 15 via feedback conductor 20 and the outer shields 16 and 17 and the outer guard ring 25 has supplied to it the amplified output of boosted guard amplifier 24. The relative gains of boosted guard amplifier 24 and buffer amplifier 15 are such that the magnitude of the amplified signal supplied to the outer guard ring 25 is greater than the amplitude of the output signal $V_t$. As explained more fully in U.S. Pat. No. 4,067,225, since the voltage of the carrier signal applied to outer guard ring 25 is greater than the voltages applied to the inner guard ring 27 and central probe member 26, but are at substantially the same frequency and phase, the arrangement serves to focus the otherwise divergent electrical field produced by the central probe member 26 at larger displacement distances from the grounded member 23 thereby producing a considerable improvement in output linearity under circumstances where the instrument is operated at relatively large displacements. During operation of the system of FIG. 2, the system functions in essentially the same manner as described with relation to the FIG. 1 circuit with the exception of the effect of the boosted guard amplifier 24 output to the outer guard member 25 whereby the advantages set forth in the preceeding description are obtained.

FIG. 3 is a schematic circuit diagram showing the construction of the buffer amplifier 15. Buffer amplifier 15 is designed to have a very high input impedance with unity gain characteristics so that it can be used to measure the voltage developed across the sensor/transducer 14 without placing a parasitic load across the sensor/transducer. The high input impedance and accurate unity gain characteristics (1.00±0.001%) of buffer amplifier 15 are achieved by the following circuit design features: (1) Use of a high impedance, matched, differential, field effect transistor pair as the input section. (2) Use of a high gain amplifier section composed of two stages that provides an open loop gain of $10^5$ at the system carrier frequency. (3) Use of positive feedback from the output of the buffer amplifier back to its input to increase the input impedance of the overall circuit.

The input section of buffer amplifer 15 is comprised of a pair of differential field effect transistors 33 such as the 2N3954 differential field effect transistor package manufactured and sold by the National Semiconductor, Inc. which provides two field effect transistors with matched parameters in a single package. The differential field effect transistors 33 are connected in circuit relationship with a bias network comprised by the resistor 31 and two constant current diodes 34 and 35 connected in series circuit relationship with the respective field effect transistors and the common bias resistor 31. The input carrier signal obtained across the sensor/transducer 14 is supplied to the gate of one of the field effect transistors and the output of the buffer amplifier 15 is fed back through a feedback conductor 30 directly to the gate of the remaining field effect transistor 33 and through capacitor 32 to the source electrodes of both field effect transistors. The input section thus comprised forms a differential follower circuit with a gain value of 1.00±0.02% and the output signals from this differential follower circuit obtained from the respective drain electrodes of the differential field effect transistors feed the input to the high gain section of the buffer amplifier.

The high gain section of buffer amplifier 15 is comprised of three stages formed by two high gain amplifier stages and a unity gain low impedance output stage. The high gain amplifier stages employ two μA715 integrated circuit operational amplifiers 36 and 43 of conventional, commercially available construction from Fairchild Camera Co. which provide the required high gain. Capacitors 37, 38 and 39 are connected to stabilize operation of the high gain amplifier stage 6 and capacitors 44, 45, and 46 stabilize operation of the amplifier stage 43. The capacitors 40, 47 and 53 provide high frequency bypass signal paths for the power supply connections to operational amplifiers 36 and 43. Resistors 41, 48, 50 and 55 and capacitors 49 and 54 provide stabilization of the overall buffer amplifier circuit. These circuit components provide a frequency shaping function of the gain characteristics of the second high gain amplifier stage 51 which insures unconditional stability for the overall buffer amplifier. At a carrier frequency of 16 kilohertz, the first stage amplifier 36 provides a gain of 5,000 and the second stage high gain amplifier 43 has a gain of 20 thus providing an overall open loop gain of $10^5$ for the buffer amplifier circuit.

The low impedance output stage is comprised by a National Semiconductor, Inc. LH0002 integrated circuit operational amplifier 51 of conventional, commercially available construction that provides a current drive capability of the order of 20 milliamperes required by the buffer amplifier circuit 15 to drive the various loads described earlier at the carrier signal frequency and voltage $V_T$. Feedback is provided through feedback conductor 30 directly back to the gate of the right hand field effect transistor of the input section and via capacitor 32 to the drain leads of the field effect transistor pair. The presence of this signal on the drain lead and the gate of one of the transistors results in an increase of the effective input impedance of the overall buffer amplifier circuit 15.

From the foregoing description it will be appreciated that the invention provides a new and improved signal amplifier system for use with control carrier signal measuring sensor/transducers of the variable impedance type which is capable of producing a linear output signal that is substantially uneffected by stray capacitance coupling effects. In this novel signal amplifier system the effects of undesired stray capacitance coupling and the like are minimized without requiring the use of isolation transformers, extraneous floating power supplies or the like and is relatively simple in construction and inexpensive to manufacture, align and maintain, and yet is reliable in operation.

Having described two embodiments of a new and improved signal amplifier system for controlled carrier signal measuring sensor/transducers of the variable impedance type constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. A controlled carrier circuit measuring sensor/transducer signal amplifier system including in combination a carrier signal oscillator for providing a carrier oscillatory signal of known frequency and fixed voltage magnitude, differential amplifier means having the carrier oscillatory signal supplied to one of the inputs thereof, reference impedance means and variable impedance sensor/transducer means connected in series circuit relationship across the output of said differential amplifier means, means for feeding back a first feedback signal to a second input to said differential amplifier means, said first feedback signal comprising the sum of the voltages across said reference impedance means and said variable impedance sensor/transducer means in series, buffer amplifier means having the input thereof connected to the juncture of the reference impedance means and the variable impedance sensor/transducer means for deriving an output voltage signal representative of the instantaneous value of the voltage across said variable impedance sensor/transducer means, and means for feeding back said output voltage signal from the output of said buffer amplifier means to a third input to said differential amplifier means in opposition to said first feedback signal for regulating the current supplied through said reference impedance means and said variable impedance sensor/transducer means to a substantially constant magnitude whereby the output voltage signal from said buffer amplifier means provides a measure of the impedance of said variable impedance transducer means.

2. A controlled carrier current measuring sensor/transducer signal amplifier system according to claim 1 further including shielded conductor means interconnected between said reference impedance means and said variable impedance sensor/transducer means and between the juncture thereof and the input of said buffer amplifier means and means for feeding back the output of said buffer amplifier means to the shielding of the shielded conductor means for driving the same.

3. A controlled carrier current measuring sensor/transducer signal amplifier system according to claim 1 further including sensor/transducer signal amplitude detector means connected to the output from said buffer amplifier means for detecting and deriving an output signal representative of the instantaneous impedance value of the variable impedance sensor/transducer means as a measure of a physical parameter being measured.

4. A controlled carrier current measuring sensor/transducer signal amplifier system according to claim 2 further including sensor/transducer signal amplitude detector means connected to the output from said buffer amplifier means for detecting and deriving an output signal representative of the instantaneous impedance value of the variable impedance sensor/transducer means as a measure of a physical parameter being measured.

5. A controlled carrier current measuring sensor/transducer signal amplifier system according to claim 1 further including grounded power supply means for supplying excitation power to at least said carrier current oscillator, said differential amplifier means, and said buffer amplifier means and wherein said series connected reference impedance means and said variable impedance sensor/transducer means are connected in series circuit relationship between the output from said differential amplifier means and ground.

6. A controlled carrier current measuring sensor/transducer signal amplifier system according to claim 4 further including grounded power supply means for supplying excitation power to at least said carrier current oscillator, said differential amplifier means, and said buffer amplifier means and wherein said series connected reference impedance means and said variable impedance sensor/transducer means are connected in series circuit relationship between the output from said differential amplifier means and ground.

7. A controlled carrier current measuring sensor/transducer signal amplifier system according to claim 2 further including shielded housing means for housing the signal processing components of the amplifier system and means for supplying the output of said buffer amplifier means to said shielded housing to drive the same, said buffer amplifier means having sufficient gain to drive the shielded housing and the shielding of the shielded conductors in parallel as loads and to supply a measurable output signal of sufficient magnitude to provide an indication of the physical parameter being measured.

8. A controlled carrier current measuring sensor/transducer signal amplifier system according to claim 6 further including shielded housing means for housing the signal processing components of the amplifier system and means for supplying the output of said buffer amplifier means to said shielded housing to drive the same, said buffer amplifier means having sufficient gain to drive the shielded housing and the shielding of the shielded conductors in parallel as loads and to supply a measurable output signal of sufficient magnitude to provide an indication of the physical parameter being measured.

9. A controlled carrier current measuring sensor/transducer signal amplifier system according to claim 1 wherein the variable impedance sensor/transducer means comprises a capacitance type, non-contact displacement and vibration measuring device having a central probe member, an inner guard ring and an outer guard ring and the system further includes boosted guard amplifier means having its input coupled to the output from said buffer amplifier means and its output coupled to the outer guard ring of the capacitance type measuring device with the inner guard ring being coupled to the output of the buffer amplifier and the central probe member being coupled to the reference impedance means, the relative gain of the boosted guard amplifier means being sufficiently great to supply a greater magnitude carrier voltage signal to the outer guard ring having the same phase and frequency as the excitation potentials supplied to said inner guard ring and central probe member by said buffer amplifier and said differential amplifier, respectively.

10. A controlled carrier current measuring sensor/transducer signal amplifier system according to claim 8 wherein the variable impedance sensor/transducer means comprises a capacitance type, non-contact displacement and vibration measuring device having a central probe member, an inner guard ring and an outer guard ring and the system further includes boosted guard amplifier means having its input coupled to the output from said buffer amplifier means and its output coupled to the outer guard ring of the capacitance type measuring device with the inner guard ring being coupled to the output of the buffer amplifier and the central probe member being coupled to the reference impedance means, the relative gain of the boosted guard amplifier means being sufficiently great to supply a greater magnitude carrier voltage signal to the outer guard ring having the same phase and frequency as the excitation potentials supplied to said inner guard ring and central probe member by said buffer amplifier and said differential amplifier, respectively.

* * * * *